(12) United States Patent
Sun et al.

(10) Patent No.: US 10,511,132 B2
(45) Date of Patent: Dec. 17, 2019

(54) CLAMPING FIXTURE FOR PLUG ELECTRODE

(71) Applicants: LITE-ON ELECTRONICS (GUANGZHOU) LIMITED, Guangzhou (CN); LITE-ON TECHNOLOGY CORPORATION, Taipei (TW)

(72) Inventors: Rui-Chien Sun, Taipei (TW); Cheng-Chi Sun, Taipei (TW); Kai-Jen Cheng, Taipei (TW); Hsiang-Chuan Lo, Taipei (TW)

(73) Assignees: LITE-ON ELECTRONICS (GUANGZHOU) LIMITED, Guangzhou (CN); LITE-ON TECHNOLOGY CORPORATION, Taipei (TW)

(*) Notice: Subject to any disclaimer, the term of this patent is extended or adjusted under 35 U.S.C. 154(b) by 0 days.

(21) Appl. No.: 16/100,478

(22) Filed: Aug. 10, 2018

(65) Prior Publication Data

US 2019/0157826 A1 May 23, 2019

Related U.S. Application Data

(60) Provisional application No. 62/588,899, filed on Nov. 20, 2017.

(30) Foreign Application Priority Data

May 23, 2018 (CN) .......................... 2018 1 0501911

(51) Int. Cl.
| | | |
|---|---|---|
| *H01R 4/38* | (2006.01) |
| *H01R 43/24* | (2006.01) |
| *B29C 45/14* | (2006.01) |
| *B29L 31/34* | (2006.01) |

(52) U.S. Cl.
CPC ....... *H01R 43/24* (2013.01); *B29C 45/14065* (2013.01); *B29C 45/14639* (2013.01); *B29C 45/14836* (2013.01); *B29L 2031/34* (2013.01)

(58) Field of Classification Search
CPC ................ H01R 13/622; H01R 25/142; H01R 13/5219; H01R 13/523; H01R 13/53
USPC ......... 439/320, 94, 271, 201, 205, 281, 190; 174/152, 75
See application file for complete search history.

*Primary Examiner* — Phuong Chi Thi Nguyen
(74) *Attorney, Agent, or Firm* — McClure, Qualey & Rodack, LLP

(57) ABSTRACT

A clamping fixture for plug electrode, including an upper mold, a lower mold and at least one clamping guide block is provided. The lower mold and the upper mold can be separated from and combined with each other. The upper mold has at least one opening through which at least one plug electrode is inserted. The at least one clamping guide block is disposed between the upper mold and the lower mold for clamping and releasing the at least one plug electrode. The lower mold has an inclined surface. When the upper mold is combined with the lower mold, the upper mold pushes the clamping guide block to move toward the lower mold, and the clamping guide block is guided by the inclined surface to move for clamping the at least one plug electrode.

10 Claims, 11 Drawing Sheets

US 10,511,132 B2

CLAMPING FIXTURE FOR PLUG ELECTRODE

This application claims the benefits of U.S. provisional application Ser. No. 62/588,899, filed Nov. 20, 2017 and People's Republic of China application Serial No. 201810501911.0, filed May 23, 2018, the subject matters of which are incorporated herein by reference.

BACKGROUND OF THE INVENTION

Field of the Invention

The invention relates in general to a clamping fixture, and more particularly to a clamping fixture for plug electrode.

Description of the Related Art

During the conventional injection molding process of a plug, a clamping fixture is used to clamp and fix a plug electrode. To avoid the plug electrode being displaced by the injection pressure during the injection molding process and avoid the dimensional stability of the plug products being unstable, the clamping fixture and the plug electrode need to be tightly fitted with each other. However, when the plug electrode is inserted into and pulled off the clamping fixture, the plug electrode may easily generate friction with the clamping fixture and be scratched. Thus, product quality will be affected.

SUMMARY OF THE INVENTION

The invention is directed to a clamping fixture for a plug electrode capable of avoiding the plug electrode being displaced by the injection pressure or scratched by the tools and accordingly increasing the dimensional stability and quality of products.

According to one embodiment of the present invention, a clamping fixture for a plug electrode, including an upper mold, a lower mold and at least one clamping guide block is provided. The lower mold and the upper mold can be separated from and combined with each other. The upper mold has at least one opening through which at least one plug electrode is inserted. The at least one clamping guide block is disposed between the upper mold and the lower mold for clamping and releasing the at least one plug electrode. The lower mold has an inclined surface. When the upper mold is combined with the lower mold, the upper mold pushes the clamping guide block to move toward the lower mold, and the clamping guide block is guided by the inclined surface to move for clamping the at least one plug electrode.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements.

Figure 1A:
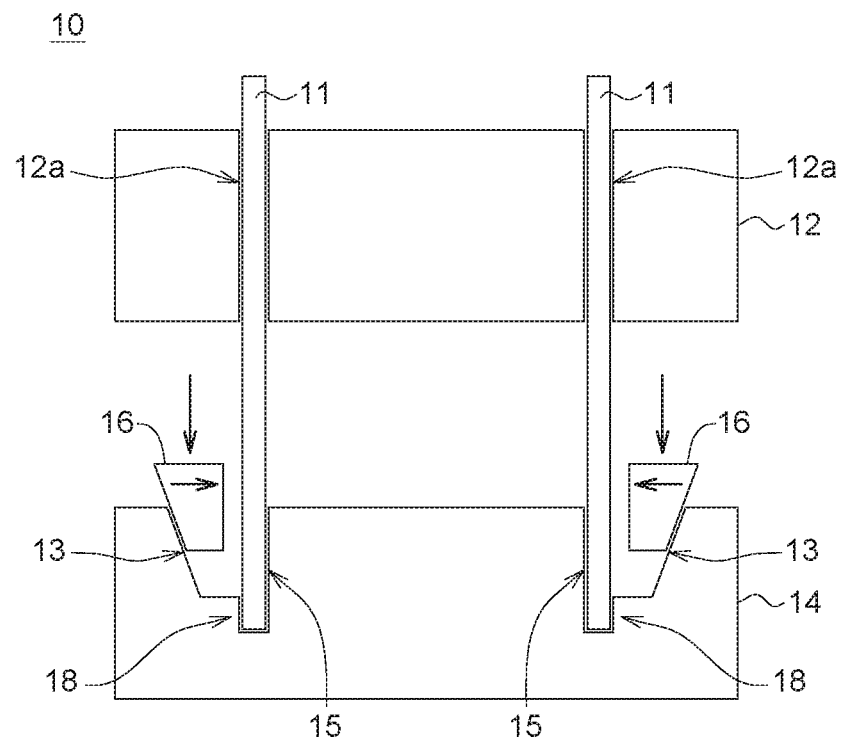
FIG. 1A shows a schematic diagram of a clamping fixture for a plug electrode according to an embodiment of the invention.

FIG. 1A shows a schematic diagram of a clamping fixture 10 for a plug electrode 11 according to an embodiment of the invention. In the present embodiment, the clamping fixture 10 is used for clamping two plug electrodes 11. However, the clamping fixture 10 can also be used for clamping one single plug electrode 11. In the present embodiment, one single plug electrode 11 corresponds to one single clamping assembly. Although two plug electrodes 11 and their corresponding clamping assemblies are illustrated in the diagram, for the convenience of explanation, the one single clamping assembly corresponding to the one single plug electrode 11 is exemplified in the following embodiments.

Refer to FIG. 1A. The clamping fixture 10 according to an embodiment of the invention includes an upper mold 12, a lower mold 14 and a clamping guide block 16. The clamping guide block 16 is disposed between the upper mold 12 and the lower mold 14. The lower mold 14 has an inclined surface 13, a positioning recess 18 and a leaning surface 15 opposite to the inclined surface 13. The clamping guide block 16 can move along the inclined surface 13. The upper mold 12 has an opening 12a corresponding to the positioning recess 18. The upper mold 12 and the lower mold 14 can be separated from and combined with each other. When the upper mold 12 is combined with the lower mold 14, the upper mold 12 pushes the clamping guide block 16 to move toward the lower mold 14. Meanwhile, the clamping guide block 16 is guided by the inclined surface 13 to move for clamping the plug electrode 11.

Before the clamping fixture 10 clamps the plug electrode 11, the upper mold 12 and the lower mold 14 are separated from each other. Meanwhile, the clamping fixture 10 is at an open position. When the clamping fixture 10 is configured to clamp the plug electrode 11, the plug electrode 11 enters the clamping fixture 10 through the opening 12a, and one end of the plug electrode 11 is positioned through the positioning recess 18. Then, the upper mold 12 is combined with the lower mold 14. When the upper mold 102 is combined with the lower mold 104, the clamping guide block 16 is pushed by the upper mold 12 and guided by the inclined surface 13 to move towards the leaning surface 15 to clamp the plug electrode 11 together with the leaning surface 15. Then, the clamping fixture 10 is at a clamping position. As mentioned above, when the plug electrode 11 enters the clamping fixture 10 through the opening 12a, the clamping guide block 16 has not yet been moved toward the leaning surface 15 to clamp the plug electrode 11. Therefore, the surface of the plug electrode 11 will not be scratched by the clamping guide block 16.

Figure 1B:
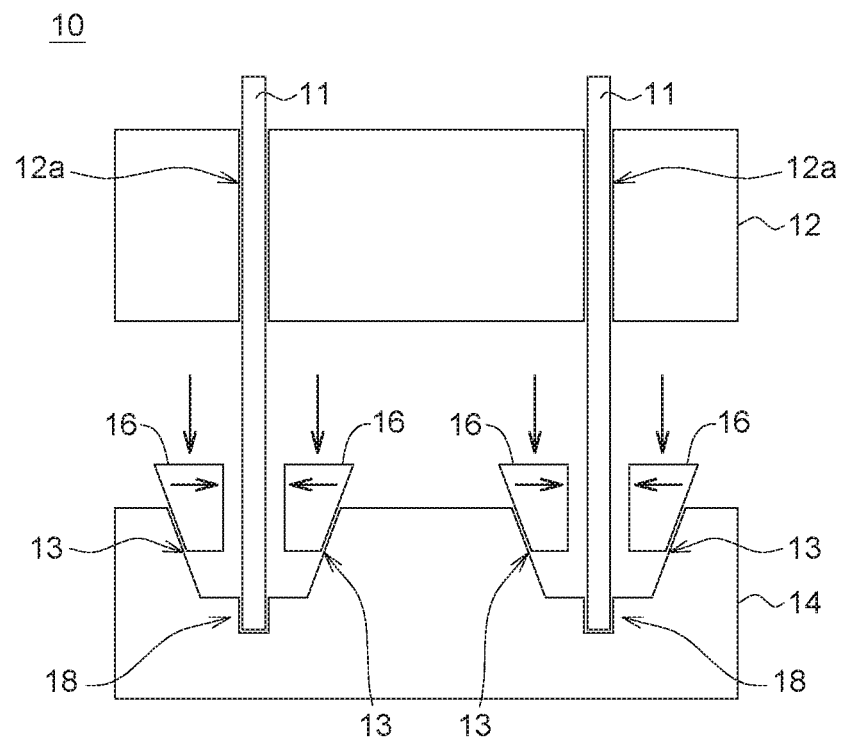
FIG. 1B is a schematic diagram of a clamping fixture for a plug electrode according to another embodiment of the invention.

Referring to FIG. 1B, a schematic diagram of a clamping fixture 10 for a plug electrode 11 according to another embodiment of the invention is shown. The present embodiment is different from the previous embodiment in that: in the clamping fixture 10 of the present embodiment, the one single clamping assembly corresponding to the one single plug electrode 11 includes two clamping guide blocks 16, and the lower mold 14 has two opposite inclined surfaces 13. When the upper mold 12 is combined with the lower mold 14, the two clamping guide blocks 16 are pushed by the upper mold 12 and guided by the inclined surfaces 13 respectively to move towards each other to clamp the plug electrode 11. Likewise, when the plug electrode 11 enters the clamping fixture 10 through the opening 12a, the two clamping guide blocks 16 have not yet clamped the plug electrode 11. Therefore, the surface of the plug electrode 11 will not be scratched by the clamping guide block 16.

Through the design of the clamping guide block 16 that can slide upwards/downwards, the plug electrode 11 will not be easily scratched by the clamping fixture 10 when entering the clamping fixture 10. Furthermore, after the plug electrode 11 enters the clamping fixture 10, the clamping fixture 10 enables the clamping guide block 16 to firmly clamp the plug electrode 11 through the combination of the upper mold 12 and the lower mold 14. Thus, the plug electrode 11 will not be easily deformed or displaced by the injection pressure, and the dimensional stability and quality of the plug electrode is further enhanced. Embodiments of detailed structures of the clamping fixture are disclosed below.

Figure 2A:
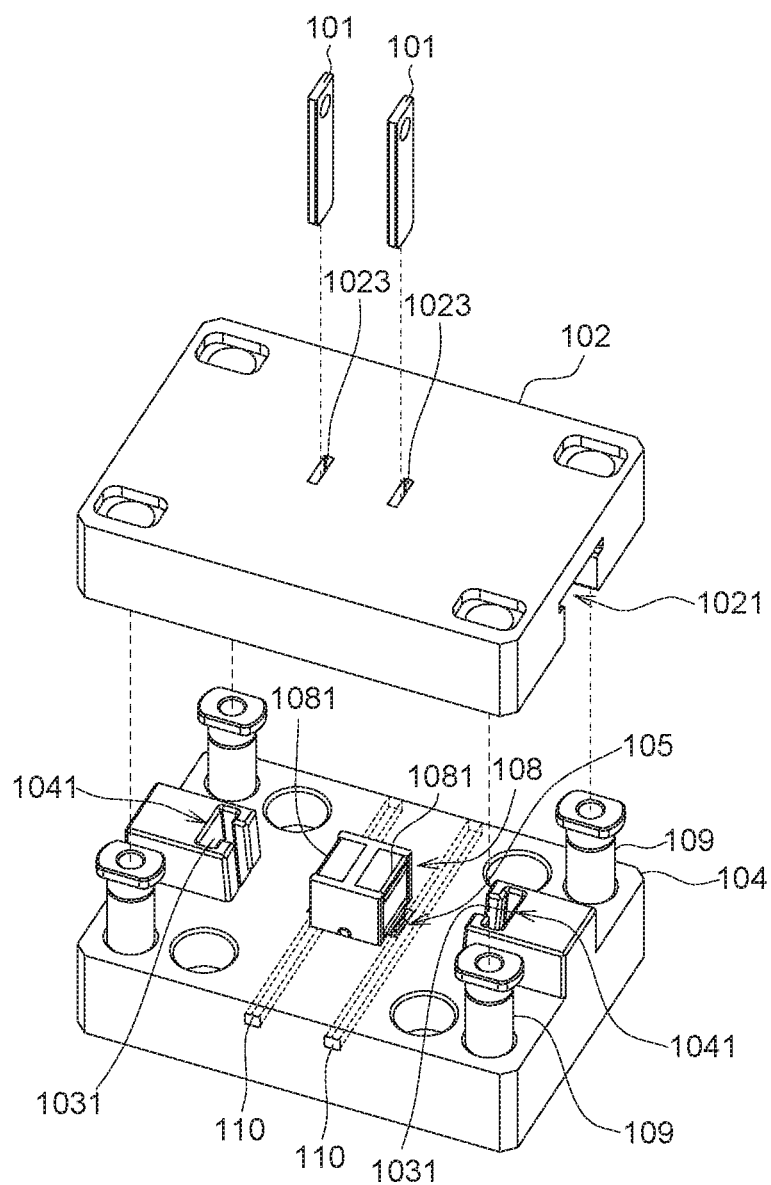
FIG. 2A is an explosion diagram of a clamping fixture for a plug electrode according to an embodiment of the invention.
Figure 2B:
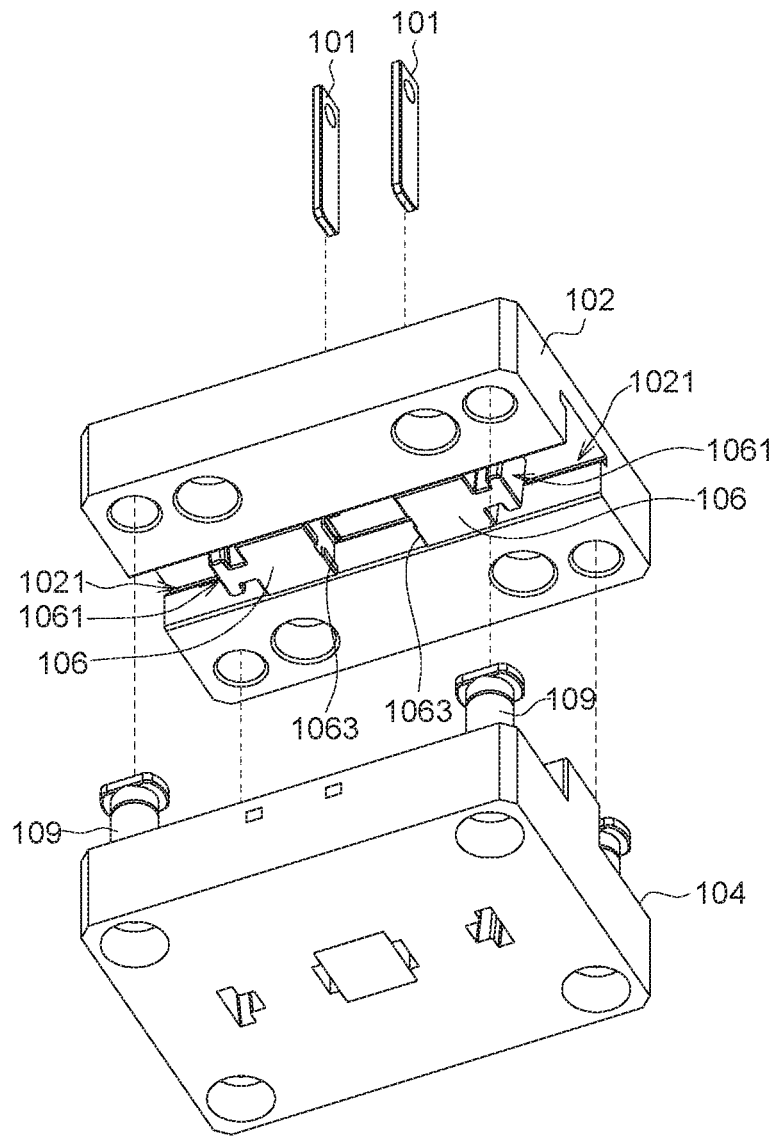
FIG. 2B is an explosion diagram of the clamping fixture for a plug electrode of FIG. 2A viewed from a downward angle.
Figure 2C:
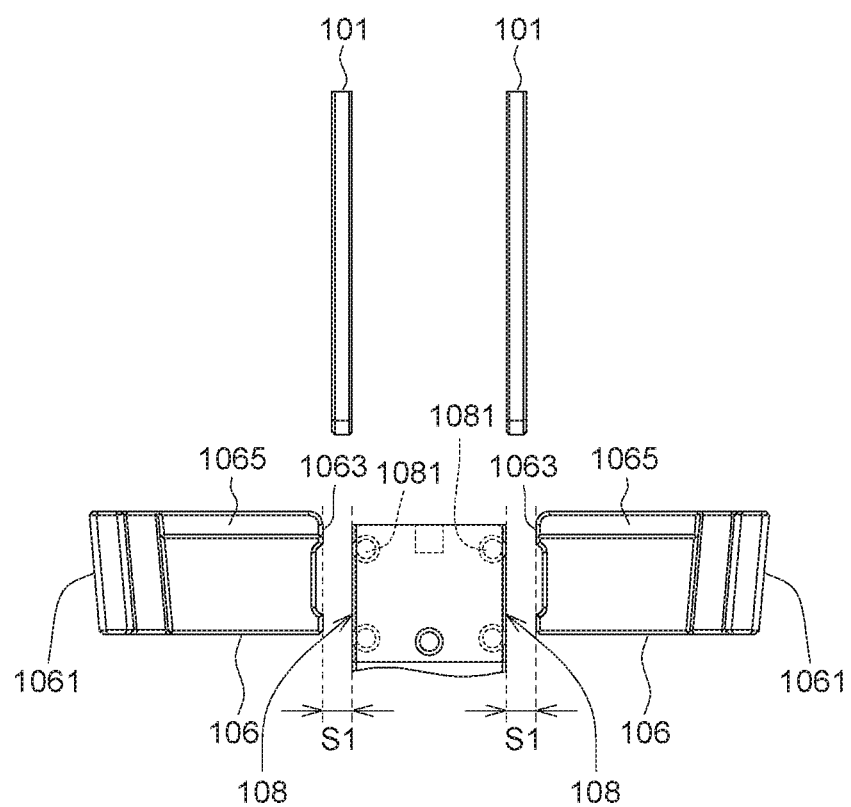
FIG. 2C is a schematic diagram of relative positions between a plug electrode, a clamping guide block and a leaning surface before the plug electrode is clamped.

FIG. 2A shows an explosion diagram of a clamping fixture 100 for a plug electrode 101 according to an embodiment of the invention. FIG. 2B shows an explosion diagram of the clamping fixture 100 for a plug electrode 101 of FIG. 2A viewed from a downward angle. FIG. 2C shows a schematic diagram of relative positions among a plug electrode 101, a clamping guide block 106 and a leaning surface 108 before the plug electrode is clamped.

According to an embodiment of the invention, the clamping fixture 100 for a plug electrode 101 can be used for clamping the plug electrodes 101 during the injection molding process of a plug. After the plug electrodes 101 is combined with the injection molded plastic body, the clamping fixture 100 releases the plug electrodes 101 to complete the manufacturing process of the plug product.

Refer to FIGS. 2A and 2B. Although two plug electrodes 101 and their corresponding clamping assemblies are illustrated in the diagram, for the convenience of explanation, the one single clamping assembly corresponding to the one single plug electrode 101 is exemplified in the following embodiments. The clamping fixture 100 for a plug electrode 101 includes an upper mold 102, a lower mold 104 and a clamping guide block 106. The upper mold 102 and the lower mold 104 are connected by multiple fixing columns 109. The clamping guide block 106 is disposed between the upper mold 102 and the lower mold 104. The lower mold 104 includes an inclined channel guide 1041. The inclined channel guide 1041 has an inclined surface 1031. The lower mold 104 further includes a positioning recess 105 and a leaning surface 108 opposite to the inclined surface 1031. The clamping guide block 106 can move along the inclined surface 1031. A gap S1 is formed between the leaning surface 108 and the clamping guide block 106 as indicated in FIG. 2C. The upper mold 102 has an opening 1023 corresponding to the gap S1 and the positioning recess 105. The upper mold 102 and the lower mold 104 can be separated from and combined with each other. When the upper mold 102 is combined with the lower mold 104, the upper mold 102 pushes the clamping guide block 106 to move toward the lower mold 104. Meanwhile, the clamping guide block 106 is guided by the inclined surface 1031 to move for clamping the plug electrode 101 together with the leaning surface 108.

In the present embodiment, the clamping guide block 106 can be slidably disposed on the upper mold 102 and the lower mold 104. Refer to FIGS. 2A-2C. The upper mold 102 has a horizontal chute 1021. The clamping guide block 106 has a horizontal slide block 1065 and an inclined guide block 1061. The horizontal slide block 1065 is correspondingly disposed in the horizontal chute 1021 and slides along the horizontal chute 1021. The inclined guide block 1061 is correspondingly disposed in the inclined channel guide 1041 and slides along the inclined surface 1031 of the inclined channel guide 1041. When the upper mold 102 is combined with the lower mold 104, the upper mold 102 pushes the clamping guide block 106 to move toward the lower mold 104. Meanwhile, the clamping guide block 106 is guided by the inclined surface 1031 to move for clamping the plug electrode 101 together with the leaning surface 108.

In the present embodiment, the horizontal slide block 1065 of the clamping guide block 106 is disposed in the horizontal chute 1021 of the upper mold 102 and is restricted to move horizontally along the horizontal chute 1021. Therefore, when the upper mold 102 and the lower mold 104 are separated from each other, the clamping guide block 106, because of the restriction between the horizontal slide block 1065 and the horizontal chute 1021, is driven by the upper mold 102 to move upwards. Meanwhile, the clamping guide block 106 is also guided by the inclined surface 1031 to move away from the leaning surface 108 to release the plug electrode 101.

Refer to FIG. 2C. Before the plug electrode is clamped, the upper mold 102 and the lower mold 104 are separated from each other, and a gap S1 larger than the thickness of the plug electrode 101 is formed between the leaning surface 108 and the clamping guide block 106. Therefore, when the plug electrode 101 is inserted into the clamping fixture, the plug electrode 101 will not generate friction with the clamping fixture 100 and not be scratched. When the upper mold 102 is combined with the lower mold 104 after the plug electrode 101 is inserted into the clamping fixture, the clamping guide block 106 is pushed by the upper mold 102 and guided by the inclined surface 1031 to move towards the leaning surface 108 to clamp the plug electrode 101 together with the leaning surface 108. When the upper mold 102 and the lower mold 104 are separated from each other after completing injection molding process, the clamping guide block 106 is pulled by the upper mold 102 and guided by the inclined surface 1031 to move away from the leaning surface 108 to release the plug electrode 101 and return to the state as indicated in FIG. 2C. Thus, when the plug electrode 101 is pulled out the clamping fixture, the plug electrode 101 will not generate friction with the clamping fixture 100 and not be scratched.

To more reduce the friction between the plug electrode 101 and the clamping fixture 100, in an embodiment as indicated in FIG. 2C, the leaning surface 108 has at least one roller 1081 disposed thereon. The quantity of the roller 1081 is such as one or two. When the quantity of the roller 1081 is one, the roller 1081 can be located at the center of the leaning surface 108. When the quantity of the roller 1081 is two, the rollers 1081 can be disposed on the top and the bottom of the leaning surface 108 to enhance the clamping stability, but the invention is not limited thereto. The roller 1081 can rolling contact the plug electrode 101 inserted into the clamping fixture 100, such that when the plug electrode 101 is inserted into and pulled out the clamping fixture 100, the plug electrode 101 will not generate friction with the clamping fixture 100 and not be scratched.

In an embodiment as indicated in FIG. 2C, the clamping guide block 106 has a bump 1063 disposed on a side corresponding to the plug electrode 101. The quantity and position of the bump 1063 can correspond to that of the roller 1081, but the invention is not limited thereto. The bump 1063 can work with the corresponding roller 1081 to clamp the plug electrode 101 to increase the clamping stability. Moreover, through the design of the bump 1063 of the clamping guide block 106, the possible friction area between the clamping guide block 106 and the plug electrode 101 can be reduced, and the friction between the plug electrode 101 and the clamping fixture 100 can also be reduced.

In an embodiment as indicated in FIG. 2A, the lower mold 104 of the clamping fixture 100 further includes a vertical positioning bar 110 used for deciding the vertical positioning position of the plug electrode. In the present embodiment, the positioning recess 105 extends along the vertical direction (that is, the direction along which the plug electrode 101 is inserted into and pulled out), and the vertical positioning bar 110 is disposed at the extending direction of the positioning recess 105. When the plug electrode 101 is inserted into the clamping fixture 100, one end of the plug electrode 101 leans on the vertical positioning bar 110. In the present embodiment, the extending direction of the vertical positioning bar 110 is perpendicular to that of the positioning recess 105, and the vertical positioning position of the plug electrode 101 is decided by the vertical positioning bar 110, more specifically, by the intersection of the vertical positioning bar 110 and the positioning recess 105.

Figure 3A:
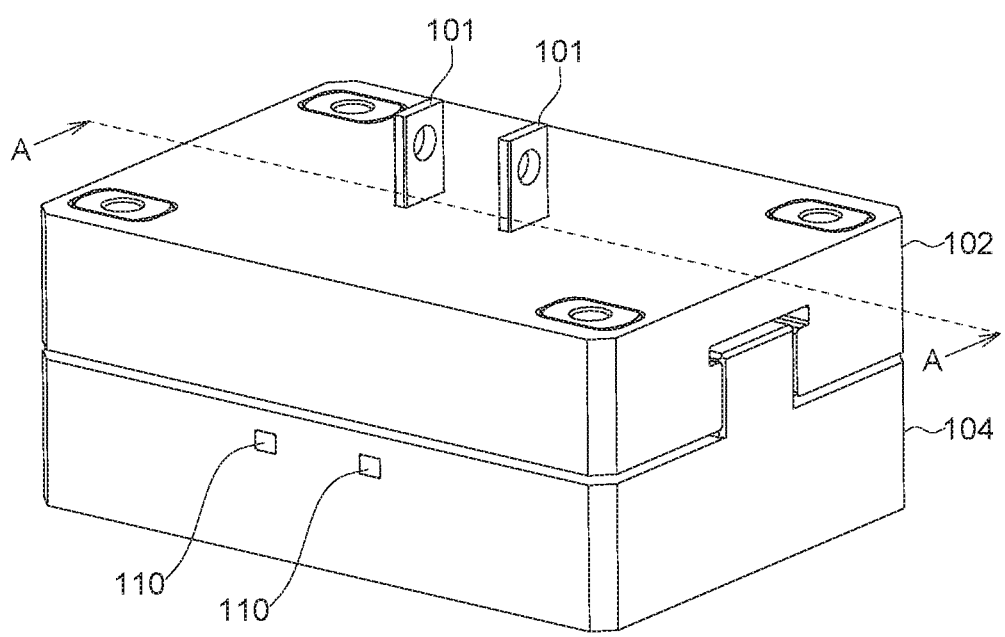
FIG. 3A is an assembly diagram of the clamping fixture for a plug electrode of shows FIG. 2A.
Figure 3B:
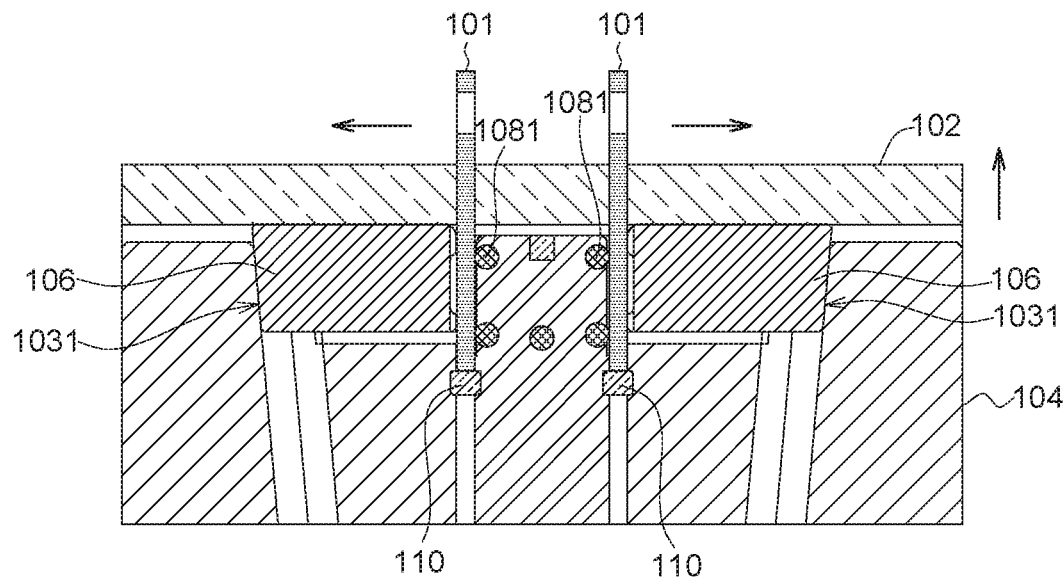
FIG. 3B is a cross-sectional view of the clamping fixture of the FIG. 3A at an open position along a cross-sectional line A-A.
Figure 3C:
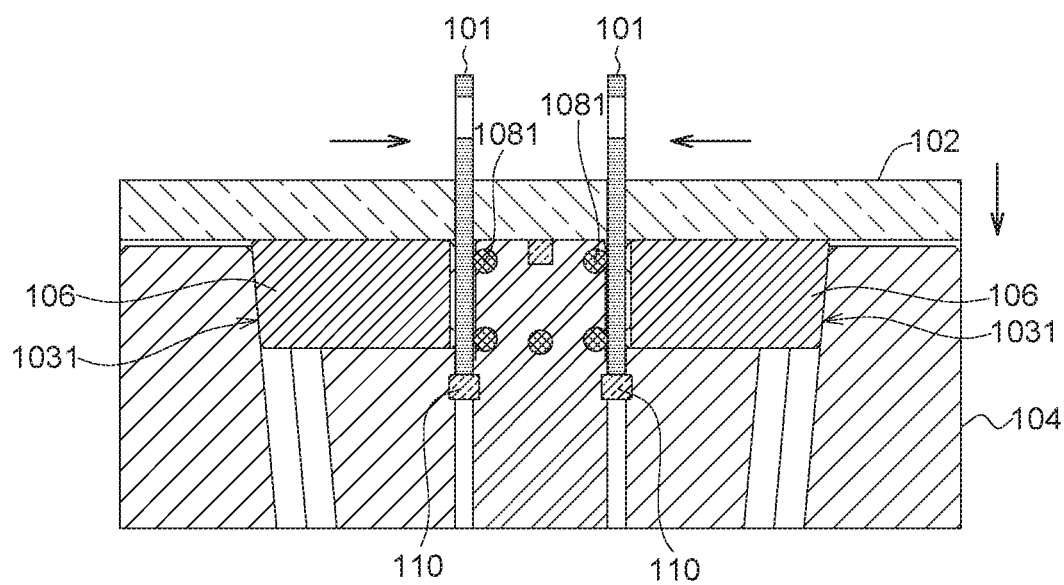
FIG. 3C is a cross-sectional view of the clamping fixture of the FIG. 3A at a clamping position along a cross-sectional line A-A.

FIG. 3A is an assembly diagram of the clamping fixture 100 for a plug electrode 101 of shows FIG. 2A. FIG. 3B is a cross-sectional view of the clamping fixture 100 of the FIG. 3A at an open position along a cross-sectional line A-A. FIG. 3C is a cross-sectional view of the clamping fixture 100 of the FIG. 3A at a clamping position along a cross-sectional line A-A.

Refer to FIGS. 3B and 3C. The upper mold 102 and the lower mold 104 can be separated from and combined with each other. When the clamping fixture 100 is at an open position, as indicated in FIG. 3B, the upper mold 102 and the lower mold 104 are separated from each other, and the plug electrode 101, the clamping guide block 106 and the leaning surface 108 are loosely fitted with each other. As indicated in FIG. 2C, a gap S1 larger than the thickness of the plug electrode 101 is formed between the leaning surface 108 and the clamping guide block 106. When the upper mold 102 is combined with the lower mold 104, the upper mold 102 pushes the clamping guide block 106 to move toward the lower mold 104. Meanwhile, the clamping guide block 106 is guided by the inclined surface 1031 to move for clamping the plug electrode 101 together with the roller 1081 of the leaning surface 108. Then, the clamping fixture 100 is at a clamping position as indicated in FIG. 3C, where the upper mold 102 and the lower mold 104 are combined with each other, and the plug electrode 101, the clamping guide block 106 and the leaning surface 108 are tightly fitted with each other. Then, when the upper mold 102 and the lower mold 104 are separated from each other after completing injection molding process, the clamping guide block 106 is driven by the upper mold 102 and guided by the inclined surface 1031 to move away from the first roller 1081 to release the plug electrode 101 and return to the state of FIG. 3B.

When the clamping fixture 100 is at an open position, the plug electrode 101, the clamping guide block 106 and the leaning surface 108 are loosely fitted with each other. Thus, when the plug electrode 101 is inserted into and pulled out the clamping fixture 100, the plug electrode 101 will not generate friction with the clamping fixture 100 and not be scratched. Moreover, when the clamping fixture 100 is at a clamping position, the plug electrode 101, the clamping guide block 106 and the leaning surface 108 are tightly fitted with each other. Thus, during the injection molding process, the plug electrode 101 will not be displaced by the injection pressure.

Figure 4A:
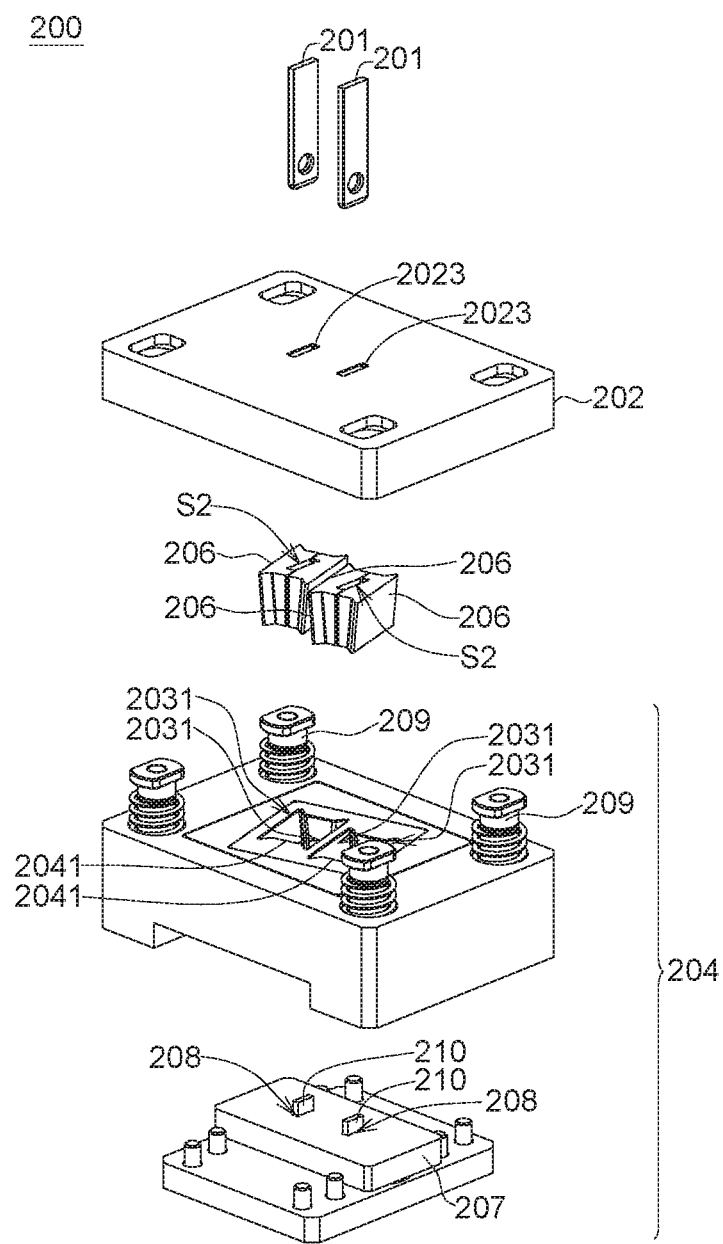
FIG. 4A is an explosion diagram of a clamping fixture for a plug electrode according to another embodiment of the invention.
Figure 4B:
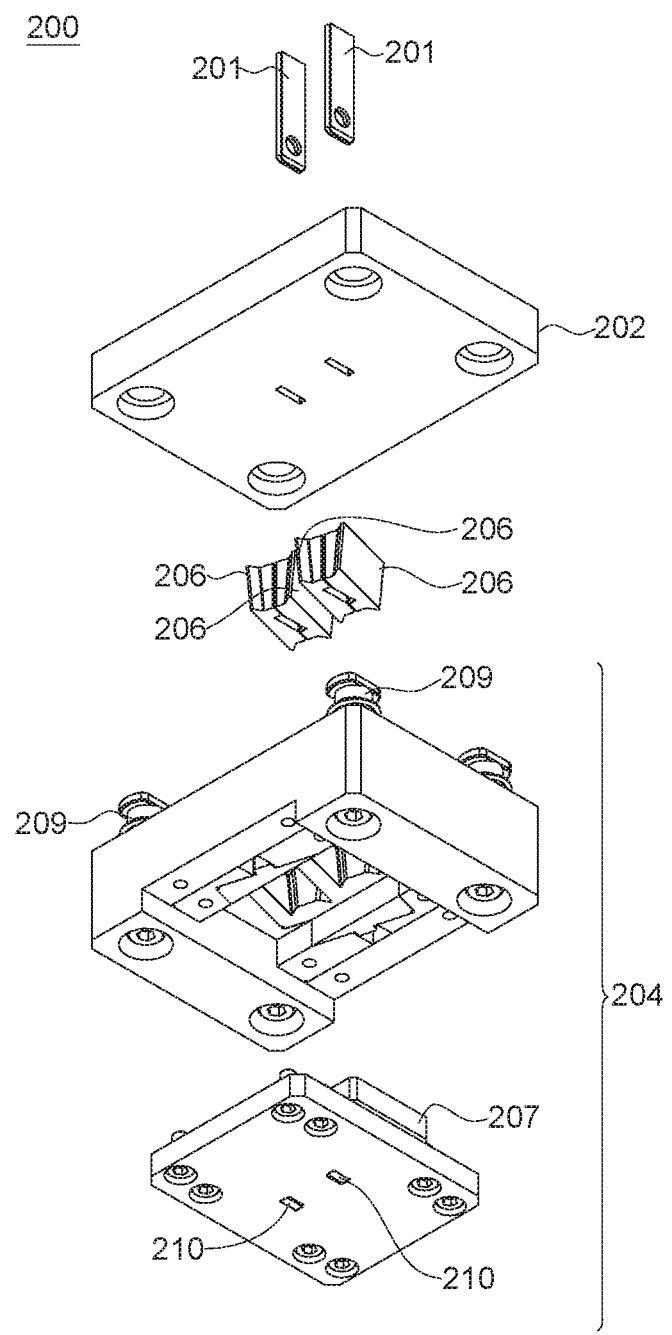
FIG. 4B is an explosion diagram of the clamping fixture for a plug electrode of FIG. 4A viewed from a downward angle.
Figure 4C:
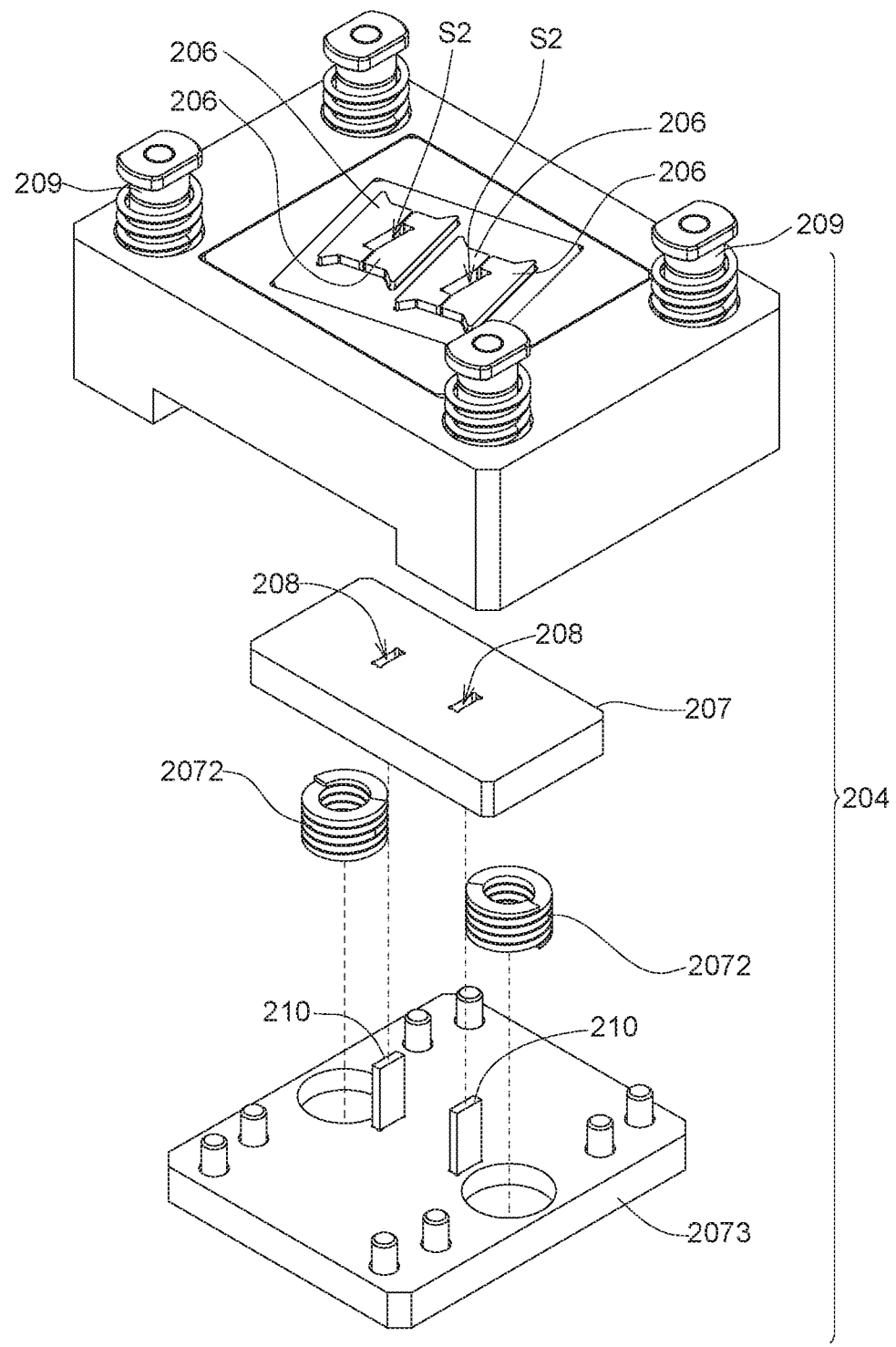
FIG. 4C is a schematic diagram showing relative positions between a clamping guide block, a lower mold and a pushing member.

FIG. 4A is an explosion diagram of a clamping fixture 200 for a plug electrode 201 according to another embodiment of the invention. FIG. 4B is an explosion diagram of the clamping fixture 200 for a plug electrode 201 of FIG. 4A viewed from a downward angle. FIG. 4C is a schematic diagram showing relative positions between a clamping guide block 206, a lower mold 204 and a pushing member 207. Although two plug electrodes 201 and their corresponding clamping assemblies are illustrated in the diagram, for the convenience of explanation, the one single clamping assembly corresponding to the one single plug electrode 201 is exemplified in the following embodiments.

The present embodiment is different from the previous embodiment in that: the present embodiment has two clamping guide blocks 206, and the plug electrode 201 is clamped by two clamping guide blocks 206. Furthermore, when the upper mold 202 and the lower mold 204 are separated from each other, the clamping guide block 206 is pushed by a pushing member 207 of the lower mold 204 to release the plug electrode 201.

Refer to FIGS. 4A-4C. The clamping fixture 200 for a plug electrode 201 includes an upper mold 202, a lower mold 204 and two clamping guide blocks 206. The lower mold 204 and the upper mold 202 are connected by multiple fixing columns 209. The clamping guide block 206 is disposed between the upper mold 202 and the lower mold 204. A gap S2 is formed between the clamping guide blocks 206. The lower mold 204 includes an inclined channel guide 2041 having two opposite inclined surfaces 2031. The lower mold 204 further includes a pushing member 207 disposed under the inclined channel guide 2041. The pushing member 207 has a positioning recess 208. Two clamping guide blocks 206 are received in the inclined channel guide 2041 and respectively correspond to two inclined surfaces 2031 and lean on the pushing member 207. The clamping guide blocks 206 can move along the corresponding inclined surface 2031. The upper mold 202 has an opening 2023 corresponding to the gap S2 and the positioning recess 208. The upper mold 202 and the lower mold 204 can be separated from and combined with each other.

In the present embodiment, before the plug electrode is clamped by the clamping fixture 200, the upper mold 202 and the lower mold 204 are separated from each other, and the gap S2 between two clamping guide blocks 106 is larger than the thickness of the plug electrode 201. Therefore, when the plug electrode 201 is inserted into, the plug electrode 201 will not generate friction with the clamping fixture 200 and not be scratched. When the upper mold 202 is combined with the lower mold 204, two clamping guide blocks 106 are pushed by the upper mold 202 and guided by the inclined surface 2031 to move towards each other and together clamp the plug electrode 201. Thereafter, when the upper mold 202 and the lower mold 204 are separated from each other, the two clamping guide blocks 206 are pushed by the pushing member 207 and guided by the inclined surface 2031 to move away from each other to release the plug electrode 201. Thus, when the plug electrode 201 is pulled out the clamping fixture 200, the plug electrode 201 will not generate friction with the clamping fixture 200 and not be scratched.

Figure 5A:
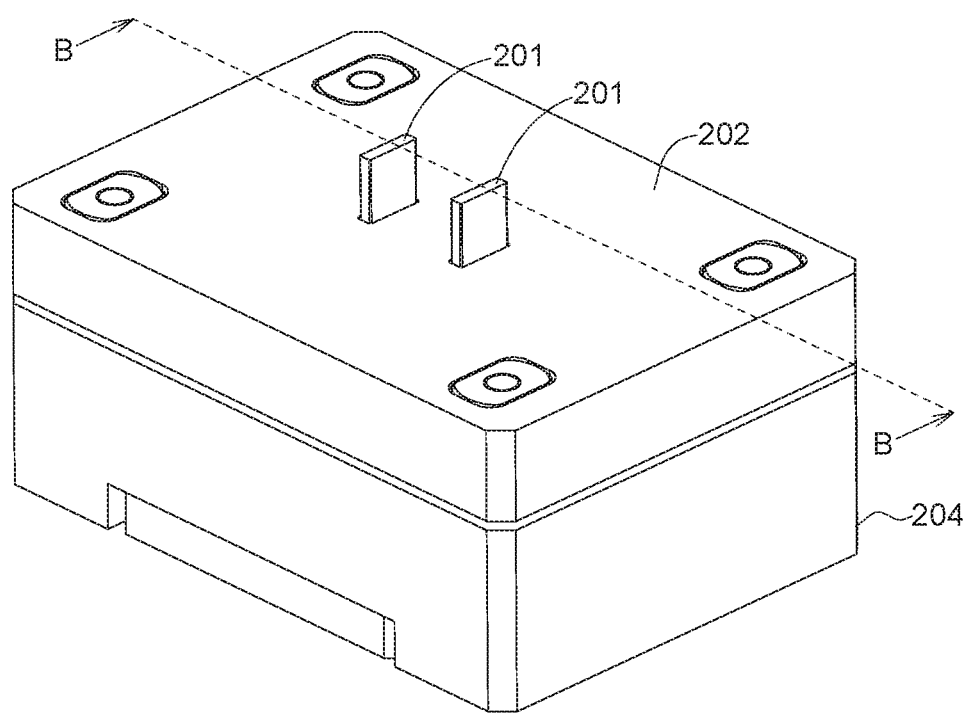
FIG. 5A shows an assembly diagram of the clamping fixture for a plug electrode of FIG. 4A.
Figure 5B:
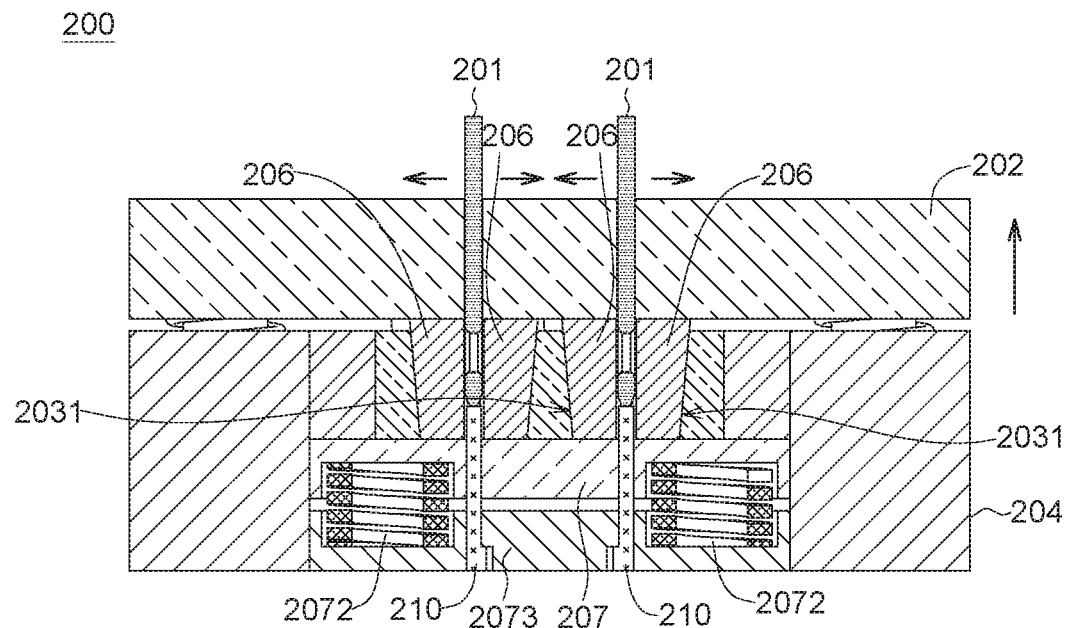
FIG. 5B is a cross-sectional view of the clamping fixture for a plug electrode of FIG. 5A at an open position along a cross-sectional line B-B.
Figure 5C:
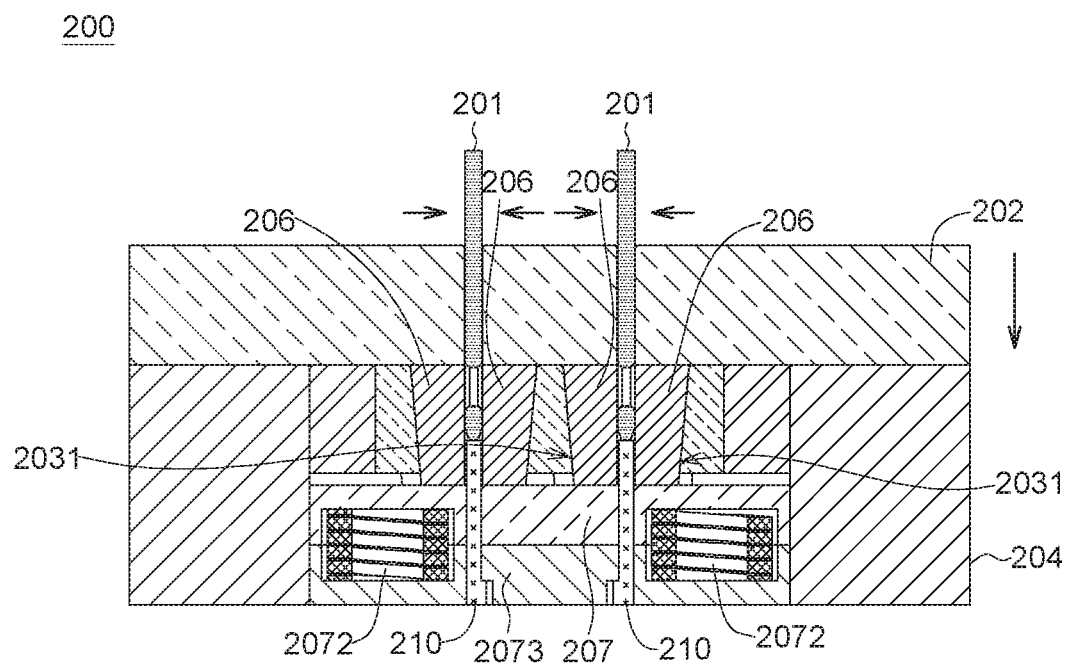
FIG. 5C is a cross-sectional view of the clamping fixture for a plug electrode of FIG. 5A at a clamping position along a cross-sectional line B-B.

Refer to FIG. 4C and FIGS. 5A-5C. FIG. 5A shows an assembly diagram of the clamping fixture 200 of FIG. 4A. FIG. 5B is a cross-sectional view of the clamping fixture 200 of FIG. 5A at an open position along a cross-sectional line B-B. FIG. 5C is a cross-sectional view of the clamping fixture 200 of FIG. 5A at a clamping position along a cross-sectional line B-B.

In the present embodiment, the pushing member 207 movably disposed in the lower mold 204 and can move upwards/downwards. In an embodiment, the lower mold 204 includes a base 2073 and at least one spring 2072 (two springs are illustrated in the diagram). The at least one spring 2072 is disposed between the pushing member 207 and the base 2073 for providing a pushing force to the pushing member 207 to push the clamping guide blocks 206 leaning on the pushing member 207 upwards.

Refer to FIGS. 5B and 5C. The upper mold 202 and the lower mold 204 can be separated from and combined with each other. When the clamping fixture 200 is at an open position, as indicated in FIG. 5B, the upper mold 202 and the lower mold 204 are separated from each other, and the plug electrode 201 and two clamping guide blocks 206 are loosely fitted with each other. When the upper mold 202 is combined with the lower mold 204, the upper mold 202 pushes the clamping guide blocks 206 to move toward the lower mold 204. Meanwhile, the clamping guide blocks 206 are also guided by the inclined surface 2031 to clamp the plug electrode 201. Besides, when the clamping guide blocks 206 are pushed to move toward the lower mold 204, the clamping guide blocks 206 push the pushing member 207 downwards to compress the spring 2072. Thereafter, the clamping fixture 200 is at a clamping position, as indicated in FIG. 5C, where the upper mold 202 and the lower mold 204 are combined with each other, and the plug electrode 201 and two clamping guide blocks 206 are tightly fitted with each other. Then, when the upper mold 202 and the lower mold 204 are separated from each other, the spring 2072 pushes the pushing member 207 upwards to push the clamping guide blocks 206. The two clamping guide blocks 206 are driven by the pushing member 207 and guided by the inclined surface 2031 to move away from each other to release the plug electrode 201 and return to the state of FIG. 5B. Thus, when the plug electrode 201 is inserted into and pulled out the clamping fixture 200, the clamping fixture 200 is at an open position, and the plug electrode 201 and the two clamping guide blocks 206 are loosely fitted with each other, hence effectively avoiding the plug electrode 201 generating friction with the clamping fixture 200 and being scratched.

In an embodiment as indicated in FIGS. 4A, 5B and 5C, the clamping fixture 200 may further include a vertical positioning bar 210 used for deciding the vertical positioning position of the plug electrode 201. In the present embodiment, the positioning recess 208 extends along the vertical direction (that is, the direction along which the plug electrode 201 is inserted into and pulled out), and the vertical positioning bar 210 is disposed in the positioning recess 208. When the plug electrode 201 is inserted into the clamping fixture 200, one end of the plug electrode 201 leans on the vertical positioning bar 210. In the present embodiment, the extending direction of the vertical positioning bar 210 is parallel to that of the positioning recess 208, the vertical positioning position of the plug electrode 201 is decided by the vertical positioning bar 210, more specifically, by the length of the vertical positioning bar 210.

The structural designs disclosed in the above embodiments can be used in different combination. In an embodiment, one single clamping assembly corresponding to one single plug electrode can clamp the plug electrode by adopting the design of one single clamping guide block and a leaning surface, and can drive the clamping guide block to release the plug electrode by adopting the design of a pushing member. In another embodiment, one single clamping assembly corresponding to the one single plug electrode can clamp the plug electrode by adopting the design of two clamping guide blocks and can drive the clamping guide blocks to release the plug electrode by adopting the design of a horizontal slide block of the clamping guide block and a horizontal chute on the upper mold.

The design of one single clamping assembly corresponding to one single plug electrode is exemplified in above embodiments, but the invention is not limited thereto. When the clamping fixture needs to clamp multiple plug electrodes, according to the above embodiments, the corresponding clamping assembly of each plug electrode can be disposed on the clamping fixture. For example, two plug electrodes and their corresponding clamping assemblies are illustrated in the embodiments of the invention.

In comparison to the conventional method, the clamping fixture for a plug electrode disclosed in the embodiments of the invention embodiment is less likely to make the plug electrode be displaced by the injection pressure or scratched by the tools, such that the dimensional stability and quality of the plug product can be increased.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A clamping fixture for plug electrode, comprising:
an upper mold, having at least one opening through which at least one plug electrode is inserted;
a lower mold, wherein the lower mold can be combined with and separated from the upper mold; and
at least one clamping guide block disposed between the upper mold and the lower mold for clamping and releasing the at least one plug electrode,
wherein the lower mold has an inclined surface, and when the upper mold is combined with the lower mold, the upper mold pushes the clamping guide block to move toward the lower mold, and the at least one clamping guide block is guided by the inclined surface to move for clamping the at least one plug electrode,
wherein the clamping guide block has at least one bump disposed on a side corresponding to the plug electrode, and the clamping guide block contacts and clamps the plug electrode through the at least one bump.

2. The clamping fixture according to claim 1, wherein when the clamping fixture is at an open position, the upper mold and the lower mold are separated from each other, and the plug electrode and the clamping guide block are loosely fitted with each other; when the clamping fixture is at a clamping position, the upper mold and the lower mold are combined with each other, and the plug electrode and the clamping guide block are tightly fitted with each other.

3. The clamping fixture according to claim 1, further comprising a vertical positioning bar disposed in the lower mold, and when the plug electrode is inserted into the clamping fixture, one end of the plug electrode leans on the vertical positioning bar.

4. The clamping fixture according to claim 1, wherein the quantity of he clamping guide blocks is two, the inclined channel guide has two opposite inclined surfaces respectively correspond to the two clamping guide blocks.

5. The clamping fixture according to claim 1, wherein the lower mold has a leaning surface opposite to the inclined surface, and when the upper mold is combined with the lower mold, the clamping guide block clamps the plug electrode together with the leaning surface.

6. The clamping fixture according to claim 5, wherein the leaning surface has at least one roller disposed thereon and having rolling contact with the plug electrode when the plug electrode is inserting into the clamping fixture through the at least one opening.

7. The clamping fixture according to claim 1, wherein the lower mold has an inclined channel guide, the upper mold has a horizontal chute, the clamping guide block has a horizontal slide block and an inclined guide block, the horizontal slide block is correspondingly disposed in the horizontal chute and slides along the horizontal chute, and the inclined guide block is correspondingly disposed in the inclined channel guide and slides along the inclined surface of the inclined channel guide.

8. The clamping fixture according to claim 7, wherein when the upper mold is separated from the lower mold, the clamping guide block, because of the restriction between the horizontal slide block and the horizontal chute, is driven by the upper mold and guided by the inclined surface to move for releasing the plug electrode.

9. The clamping fixture according to claim 1, wherein the lower mold further comprises a pushing member movably disposed in the lower mold, the clamping guide block leans on the pushing member, and when the upper mold is separated from the lower mold, the pushing member pushes the clamping guide block so that the clamping guide block is guided by the inclined surface to move for releasing the plug electrode.

10. The clamping fixture according to claim 9, wherein the lower mold further comprises at least one spring used for providing a pushing force to the pushing member; when the upper mold and the lower mold are combined with each other, the upper mold drives the clamping guide block to move toward the lower mold and push the pushing member to move downwards and compress the spring; when the upper mold and the lower mold separated from each other, the spring pushes the pushing member to move upwards and push the clamping guide block.

* * * * *